US009985862B2

(12) United States Patent
Hu et al.

(10) Patent No.: US 9,985,862 B2
(45) Date of Patent: May 29, 2018

(54) MEP CONFIGURATION METHOD AND NETWORK DEVICE

(71) Applicant: HUAWEI TECHNOLOGIES CO., LTD., Shenzhen (CN)

(72) Inventors: Kun Hu, Xi'an (CN); Rui Chen, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 92 days.

(21) Appl. No.: 14/971,091

(22) Filed: Dec. 16, 2015

(65) Prior Publication Data

US 2016/0105348 A1    Apr. 14, 2016

Related U.S. Application Data

(63) Continuation of application No. PCT/CN2013/077349, filed on Jun. 17, 2013.

(51) Int. Cl.
*G01R 31/08* (2006.01)
*H04L 12/26* (2006.01)
(Continued)

(52) U.S. Cl.
CPC .......... *H04L 43/103* (2013.01); *H04L 12/413* (2013.01); *H04L 12/4641* (2013.01);
(Continued)

(58) Field of Classification Search
USPC ..................................... 370/242, 216, 241.1
See application file for complete search history.

(56) References Cited

U.S. PATENT DOCUMENTS 8,175,008 B1    5/2012 Rustagi et al.
8,416,696 B2 *  4/2013 Salam ................ H04L 43/0811
                                              370/241
(Continued)

FOREIGN PATENT DOCUMENTS

CN    1855850 A    11/2006
CN    101369922 A    2/2009
(Continued)

OTHER PUBLICATIONS

International Search Report dated Mar. 13, 2014, in corresponding International Application No. PCT/CN2013/077349.
(Continued)

*Primary Examiner* — Phuongchau Ba Nguyen
(74) *Attorney, Agent, or Firm* — Staas & Halsey LLP

(57) ABSTRACT

In the communications field, an MEP configuration method and an Ethernet device are provided. The method includes: receiving, by an Ethernet device, a CCM message and parsing the CCM message to acquire configuration information in the CCM message and a virtual local area network VLAN of the CCM message; and determining, by the Ethernet device according to configuration information, whether the CCM message is MEP configuration that needs to be configured, and if it is determined that the CCM message is the MEP configuration that needs to be configured, complete the MEP configuration according to the configuration information and the VLAN of the CCM message. A method provided in a specific implementation manner of the present invention has an advantage of configuring MEP configuration automatically.

14 Claims, 4 Drawing Sheets

(51) Int. Cl.
*H04L 12/413* (2006.01)
*H04L 12/46* (2006.01)
*H04L 12/24* (2006.01)

(52) U.S. Cl.
CPC .......... *H04L 41/06* (2013.01); *H04L 41/0853* (2013.01); *H04L 41/0869* (2013.01); *H04L 43/0811* (2013.01)

(56) References Cited

U.S. PATENT DOCUMENTS

| | | | |
|---|---|---|---|
| 2009/0161672 A1* | 6/2009 | Shimada | H04L 12/4625 370/389 |
| 2010/0082807 A1 | 4/2010 | Wang | |
| 2010/0188983 A1 | 7/2010 | Washam et al. | |
| 2010/0238808 A1 | 9/2010 | Salam et al. | |
| 2010/0290345 A1* | 11/2010 | Gero | H04L 43/0811 370/241.1 |
| 2013/0114394 A1* | 5/2013 | Hu | H04L 41/0816 370/216 |

FOREIGN PATENT DOCUMENTS

| | | |
|---|---|---|
| CN | 101651575 A | 2/2010 |
| CN | 101662383 A | 3/2010 |
| CN | 102215130 A | 10/2011 |

OTHER PUBLICATIONS

European Office Action dated Dec. 22, 2015 in corresponding European Patent Application No. 13883350.4.
Extended European Search Report dated Jul. 27, 2015 in corresponding European Patent Application No. 13883350.4.
"IEEE Standard for Local and metropolitan area networks—Virtual Bridged Local Area Networks Amendment 5: Connectivity Fault Management", IEEE Computer Society, Dec. 17, 2007, 260 pages.
"IEEE P802.1ag/D8.1 Draft Standard for Local and Metropolitan Area Networks—Virtual Bridged Local Area Networks—Amendment 5: Connectivity Fault Management", LAN MAN Standards Committee of the IEEE Computer Society, Jun. 18, 2007, 256 pages.

* cited by examiner

MEP CONFIGURATION METHOD AND NETWORK DEVICE

CROSS-REFERENCE

This application is a continuation of International Application No.PCT/CN2013/077349, filed on Jun. 17, 2013, which is hereby incorporated by reference in its entirety.

TECHNICAL FIELD

Embodiments of the present invention relate to the communications field, and in particular, to an MEP configuration method and a network device.

BACKGROUND

With characteristics of ease of use and low costs, an Ethernet (Ethernet) technology has become one of the most important technologies in an entire communications network. With the continuous development of a telecommunications network, the Ethernet technology has been applied to an enterprise network, a metropolitan area network, and a wide area network on a large scale. A traditional management and maintenance means of the Ethernet technology is extremely limited, and a carrier-class operation means is even unavailable. As a result, an operator can only depend on a Simple Network Management Protocol (SNMP for short) to manage an Ethernet network. The number of Ethernet devices managed in this manner is limited and a large number of Internet Protocols (IP for short) are required. It is increasingly evident that the operator increases costs in deployment, management, and maintenance of the Ethernet are becoming. Therefore, it is imperative to fill in gaps of an Ethernet Operation, Administration and Maintenance (OAM for short) protocol.

The operation, management and maintenance of the Ethernet is referred to as Ethernet OAM, and a related protocol standard is IEEE 802.1ag. The IEEE 802.1ag protocol is a Connectivity Fault Management protocol and also referred to as the Connectivity Fault Management (CFM for short) protocol. The protocol has capabilities of end-to-end fault detection, fault verification, and fault location at a service level and a network level.

Existing maintenance end point (MEP for short) configuration is manual configuration, and therefore the existing MEP configuration is relatively complex, which increases difficulty in extensive popularization of practical application of CFM.

SUMMARY

The purpose of the present invention is to provide an MEP configuration method used to perform configuration for an MEP.

According to a first aspect, a maintenance end point MEP configuration method is provided, including the following steps:
  receiving a continuity check message CCM from a peer device;
  parsing the CCM message to acquire information about the peer device, where the information about the peer device includes: a maintenance domain MD level, a maintenance association identifier MA ID, and a CCM transmission interval of a peer MEP;
  acquiring information about a port receiving the CCM message, where the information about the port includes: identifier information of the port receiving the CCM message and a virtual local area network tag VLAN tag of the CCM message; and
  completing MEP configuration according to the information about the peer device and the information about the port.

With reference to the maintenance end point MEP configuration method in the first aspect, in a first optional solution of the first aspect, before the completing the MEP configuration according to the information about the peer device and the information about the port, the method further includes:
  determining whether MEP configuration to be completed according to the information about the peer device and the information about the access port conflicts with existing configuration; and if the MEP configuration to be completed according to the information about the peer device and the information about the access port does not conflict with the existing configuration, completing the MEP configuration according to the information about the peer device and the information about the access port.

With reference to the maintenance end point MEP configuration method in the first aspect, in a second optional solution of the first aspect, the completing MEP configuration according to the information about the peer device and the information about the port specifically includes:
  creating an MD according to a maintenance domain MD type, an MD name, and an MD level in the information about the peer device;
  creating an MA according to a maintenance association MA type and an MA name in the information about the peer device;
  associating the created MA with the VLAN tag;
  configuring a CCM message transmission interval in the created MA according to the CCM message transmission interval in the information about the peer device;
  adding an MEP ID of the peer device and an MEP ID of a local device to an MEP list List; and
  performing MEP configuration for a preset port and comparing whether the identifier information of the port is the same as an identifier of the preset port; if an identifier of the access port is the same as the identifier of the preset port, configuring an MEP direction to down down; and if the identifier of the access port is different from the identifier of the preset port, configuring the MEP direction to up up.

With reference to the second optional solution of the first aspect, in a third optional solution of the first aspect, a manner of acquiring the MEP ID of the local device specifically is:
  directly acquiring a pre-configured MEP ID of the local device or calculating the MEP ID of the local device according to the MEP ID of the peer device by using a preset algorithm.

With reference to the first optional solution of the first aspect, in a fourth optional solution of the first aspect, the method further includes:
  skipping performing the MEP configuration if the MEP configuration to be completed according to the information about the peer device and the information about the port conflicts with the existing configuration; and after it is confirmed that the CCM message does not match an existing MEP, it is confirmed that the CCM message also does not match pre-configuration preset by a user, or it is confirmed that the CCM message is not stored in a preset pass-through CCM information list, storing the information about the peer device in the CCM message in the pass-through CCM information list.

With reference to the first optional solution of the first aspect, in a fifth optional solution of the first aspect, the determining whether MEP configuration to be completed according to the information about the peer device and the information about the port conflicts with existing configuration specifically includes:

determining that a conflict exists if the MA ID in the CCM message is the same as configuration information of a configured MEP; or determining that a conflict exists if the MD level in the CCM message exists in an MD level of a configured MEP and an MD name or type is different; or determining that a conflict exists if the number of configured MAs exceeds an upper limit; or determining that a conflict exists if an MD name in an MA ID of a configured MEP is the same as an MD name in the MA ID in the CCM message, but an MD level of the configured MEP is different from the MD level in the CCM message.

According to a second aspect, a network device is provided, including:

a receiving unit, configured to receive a continuity check message CCM from a peer device;

a parsing unit, configured to parse the CCM message to acquire information about the peer device, where the information about the peer device includes: a maintenance domain MD level, a maintenance association identifier MA ID, and a CCM transmission interval of a peer MEP;

a path acquiring unit, configured to acquire information about a port receiving the CCM message, where the information about the port includes: identifier information of the port receiving the CCM message and a virtual local area network tag VLAN tag of the CCM message; and a configuring unit, configured to complete MEP configuration according to the information about the peer device and the information about the port.

With reference to the network device of the second aspect, in a first optional solution of the second aspect, the device further includes:

a determining unit, configured to determine whether MEP configuration to be completed according to the information about the peer device and the information about the access port conflicts with existing configuration.

With reference to the network device of the second aspect, in a second optional solution of the second aspect, the configuring unit is specifically configured to:

automatically create an MD according to an MD type, an MD name, and the MD level in the information about the peer device;

automatically create an MA according to an MA type and an MA name in the information about the peer device;

associate the created MA with the VLAN tag;

configure a CCM message transmission interval in the created MA according to the CCM message transmission interval in the information about the peer device;

add an MEP ID of the peer device and an MEP ID of the network device to an MEP list List; and perform MEP configuration for a preset port and compare whether the identifier information of the port is the same as an identifier of the preset port; if an identifier of the access port is the same as the identifier of the preset port, configure an MEP direction to down down; and if the identifier of the access port is different from the identifier of the preset port, configure the MEP direction to up up.

With reference to the second optional solution of the second aspect, in a third optional solution of the second aspect, the network device further includes:

an acquiring unit, configured to directly acquire a pre-configured MEP ID of the network device or calculate the MEP ID of the network device according to the MEP ID of the peer device by using a preset algorithm.

With reference to the first optional solution of the second aspect, in a fourth optional solution of the second aspect, the network device further includes:

a pass-through processing unit, configured to skip performing the MEP configuration when the determining unit determines that the MEP configuration to be completed according to the information about the peer device and the information about the port conflicts with the existing configuration; and after it is confirmed that the CCM message does not match an existing MEP, it is confirmed that the CCM message also does not match pre-configuration preset by a user, or it is confirmed that the CCM message is not stored in a preset pass-through CCM information list, store the information about the peer device in the CCM message in the pass-through CCM information list.

With reference to the first optional solution of the second aspect, in a fifth optional solution of the second aspect, the determining unit is specifically configured to:

determine that a conflict exists if the MA ID in the CCM message is the same as configuration information of a configured MEP; or determine that a conflict exists if the MD level in the CCM message exists in an MD level of a configured MEP and an MD name or type is different; or determine that a conflict exists if the number of configured MAs exceeds an upper limit; or determine that a conflict exists if an MD name in an MA ID of a configured MEP is the same as an MD name in the MA ID in the CCM message, but an MD level of the configured MEP is different from the MD level in the CCM message.

According to a third aspect, a network device is provided, where the network device includes: a processor, a memory, a communications interface, and a bus.

The communications interface is configured to receive a CCM message from a peer device.

The processor is configured to: parse the CCM message to acquire information about the peer device and acquire information about a port receiving the CCM message, where the information about the port includes: identifier information of the port receiving the CCM message and a virtual local area network tag VLAN tag of the CCM message; and complete MEP configuration according to the information about the peer device and the information about the port.

With reference to the network device of the third aspect, in a first optional solution of the third aspect, the processor is further configured to:

determine whether MEP configuration to be completed according to the information about the peer device and the information about the access port conflicts with existing configuration; and when it is determined that the MEP configuration to be completed according to the information about the peer device and the information about the access port does not conflict with the existing configuration, complete the MEP configuration according to the information about the peer device and the information about the port.

With reference to the network device of the third aspect, in a second optional solution of the third aspect, the processor is specifically configured to: automatically create an MD according to a maintenance domain MD type, an MD name, and an MD level in the information about the peer device; automatically create an MA according to a maintenance association MA type and an MA name in the information about the peer device; automatically associate the created MA with the VLAN tag; automatically configure a CCM message transmission interval in the created MA according to a CCM message transmission interval in the information about the peer device; add an MEP ID of the peer device and an MEP ID of the network device 400 to an MEP List; perform MEP configuration for a preset port and compare whether an identifier of the access port is the same as an identifier of the preset port; if the identifier of the access port is the same as the identifier of the preset port, configure an MEP direction to down; and if the identifier of the access port is different from the identifier of the preset port, configure the MEP direction to up up.

According to a fourth aspect, a network system is provided, where the system includes: a first network device and a second network device, where:
the first network device is configured to send a continuity check message CCM to the second network device; and
the second network device is configured to: receive a CCM message from a peer device and parse the CCM message to acquire information about the peer device and acquire information about a port receiving the CCM message, where the information about the port includes: identifier information of the port receiving the CCM message and a virtual local area network tag VLAN tag of the CCM message; and complete MEP configuration according to the information about the peer device and the information about the port.

In embodiments of the present invention, technical solutions provided in the present invention have advantages of easy MEP configuration, high efficiency, and wide application.

BRIEF DESCRIPTION OF DRAWING(S)

DESCRIPTION OF EMBODIMENTS

To make the objectives, technical solutions, and advantages of the present invention more comprehensible, the following further specifically describes the present invention with reference to accompanying drawings and embodiments. It should be understood that, the described specific embodiments are only used to explain the present invention, but not to limit the present invention.

Figure 1:
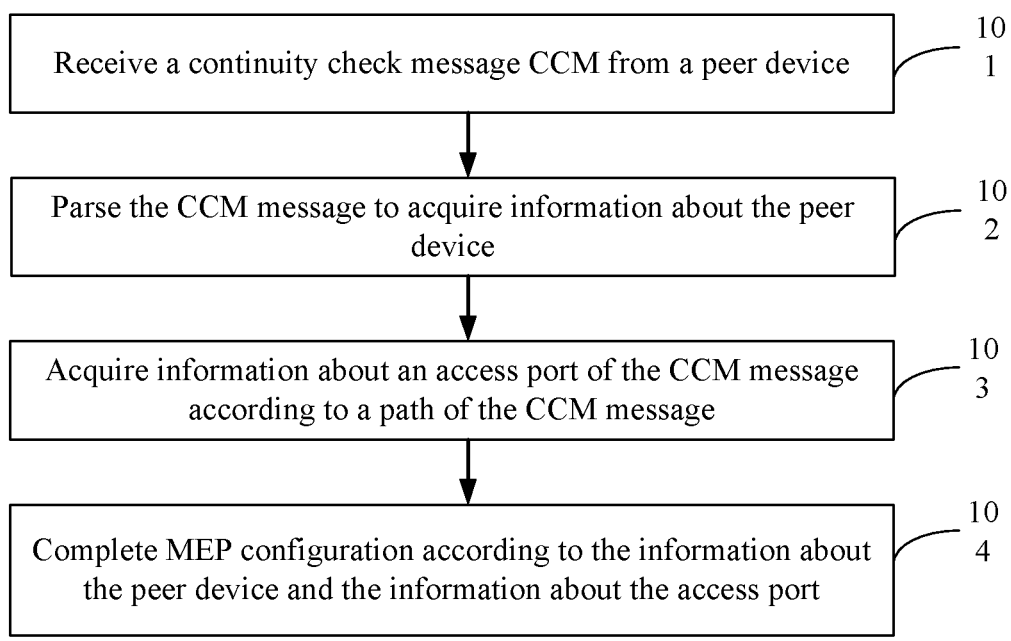
FIG. 1 is a schematic structural diagram of a CCM message body according to a specific implementation manner of the present invention.

A specific implementation manner of the present invention provides a maintenance end point MEP configuration method, where the method is completed by a local Ethernet device. As shown in FIG. 1, the method includes the following steps:
 101. Receive a continuity check message CCM from a peer device.
 102. Parse the CCM message to acquire information about the peer device.
 103. Acquire information about a port receiving the CCM message.
 The information about the port may include: an identifier of the port and a virtual local area network (VLAN for short) tag of the CCM message.
 104. Complete MEP configuration according to the information about the peer device and the information about the port.

Optionally, before the method in the step 104 further includes:
 determining whether MEP configuration to be completed according to the information about the peer device and the information about the port conflicts with existing configuration; and if the MEP configuration to be completed according to the information about the peer device and the information about the port does not conflict with the existing configuration, performing 104.

A CCM message body is shown in FIG. 1, where a flag (Flags) field is further specifically divided into three fields: a remote defect indication (RDI) field, a reserved field, and a CCM interval field. It can be learned from FIG. 1 that the CCM message carries a maintenance domain (MD) level, an MD type, an MD name, a maintenance association (MA) type, an MA name, and a CCM transmission interval. During the MEP configuration, a local MEP and a peer MEP must have completely same MD levels, MA IDs, and CCM transmission intervals. This also means that the MD level, the MA ID, and the CCM transmission interval of the peer MEP can be acquired by parsing a standard CCM message sent by the local MEP. The MA ID may include: an MD type, an MD name, an MA type, and an MA name. In addition, configuration information may further include information except the MD level, the MA ID, and the CCM transmission interval. This specific implementation manner of the present invention does not set limitations on other configuration information (that is, the information except the MA level, the MA ID, and the CCM transmission interval).

A local Ethernet device in a method provided in this specific implementation manner of the present invention can automatically complete MEP configuration according to a CCM message, and therefore the method has advantages of easy MEP configuration, high efficiency, and wide application.

Embodiment 1

Figure 2:
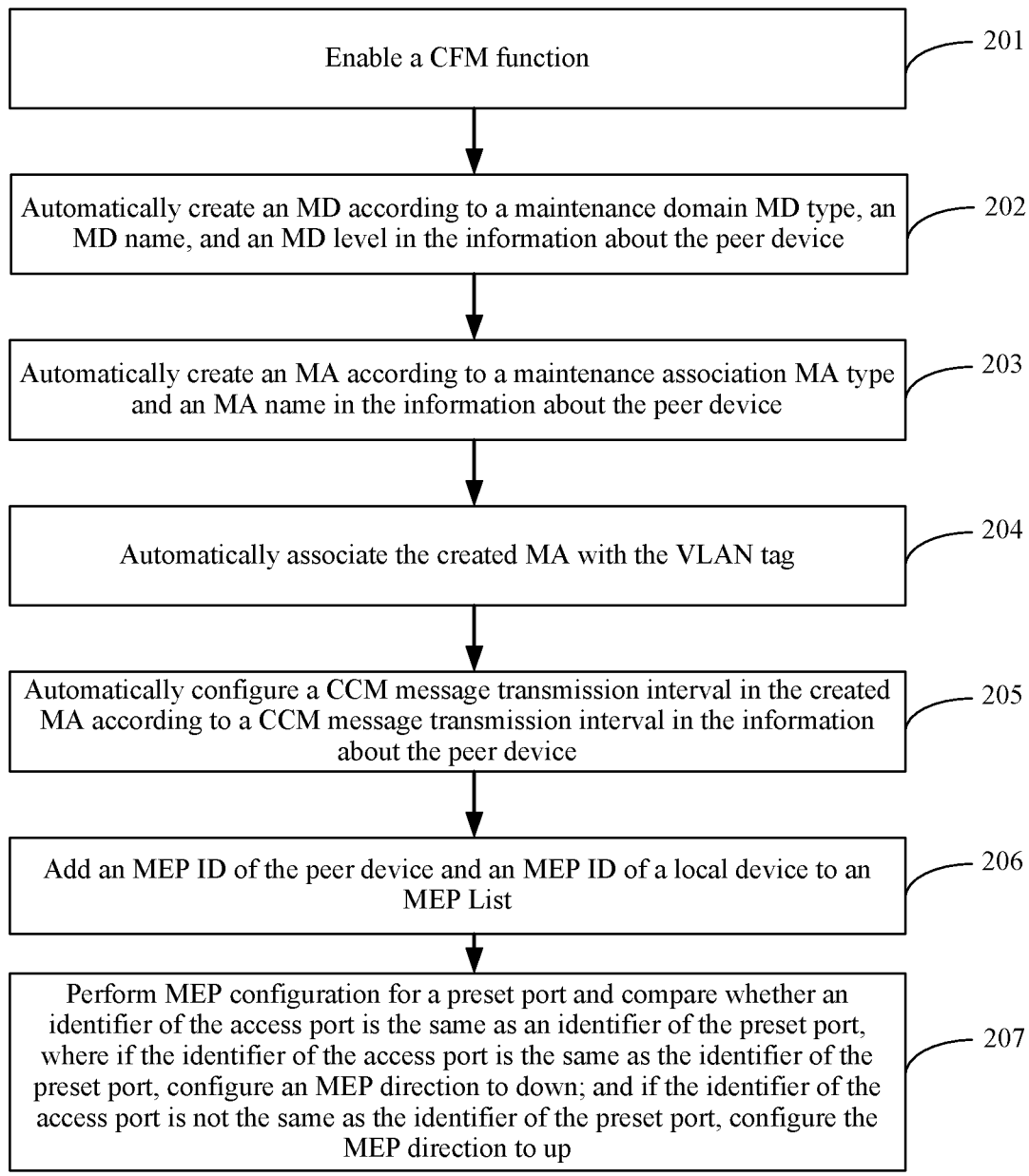
FIG. 2 is a flowchart of an MEP configuration method according to a specific implementation manner of the present invention.

Embodiment 1 provides a specific method for completing MEP configuration according to the information about the peer device and the information about the port, as shown in FIG. 2, including:
 201. Enable a CFM function.
 201 is merely a specific implementation manner of an embodiment. If the CFM function has been enabled, the step 201 does not need to be performed, and a step 202 and subsequent steps are directly performed.

202. Automatically create an MD according to a maintenance domain MD type, an MD name, and an MD level in the information about the peer device.

203. Automatically create an MA according to a maintenance association MA type and an MA name in the information about the peer device.

204. Automatically associate the created MA with the VLAN tag.

205. Automatically configure a CCM message transmission interval in the created MA according to a CCM message transmission interval in the information about the peer device.

206. Add an MEP ID of the peer device and an MEP ID of a local device to an MEP list (List).

207. Perform MEP configuration for a preset port and compare whether an identifier of the access port is the same as an identifier of the preset port; if the identifier of the access port is the same as the identifier of the preset port, configure an MEP direction to down (down); and if the identifier of the access port is different from the identifier of the preset port, configure the MEP direction to up (up).

The configuring the MEP direction to up (UP) may specifically mean: an MEP that is defined in a bridge and sends a CFM message to a forwarding entity of the bridge and receives a CFM message from the forwarding entity of the bridge; and the configuring an MEP direction to down (Down) may specifically mean: an MEP that is defined in a bridge and sends a CFM message to a physical medium and receives a CFM message from the physical medium.

Optionally, a manner of acquiring the MEP ID of the local device specifically is:

acquiring a pre-configured MEP ID of the local device or calculating the MEP ID of the local device according to the MEP ID of the peer device by using a preset algorithm.

The calculating the MEP ID of the local device according to a preset algorithm is suitable for a 1:1 mode; and the directly acquiring a pre-configured MEP ID of the local device is suitable for an N:1 mode, where N represents the number of local devices.

The preset algorithm may be an algorithm according to which the MEP ID of the local device different from the MEP ID of the peer device can be calculated, for example, 1 may be directly added to the MEP ID of the peer device. Certainly, the preset algorithm may be a more complex algorithm, for example, the MEP ID of the local device= [(the MEP ID of the peer device) % 8191]+1. Certainly, the preset algorithm may be another calculation method, and this specific implementation manner of the present invention does not specifically limit thereto.

Optionally, the method further includes:

skipping performing the MEP configuration when MEP configuration to be completed according to the information about the peer device and the information about the port conflicts with existing configuration; and after it is confirmed that the CCM message does not match an existing MEP, it is confirmed that the CCM message also does not match pre-configuration preset by a user, or it is confirmed that the CCM message is not stored in a preset pass-through CCM information list, storing the information about the peer device in the CCM message in the pass-through CCM information list. The pass-through CCM information list may specifically include: information about a pass-through CCM message, which may specifically include: an MD type, name, and level; an MA type and name; a CCM message transmission interval; an MEP ID; and the like that are included in the pass-through CCM message.

Optionally, the determining whether MEP configuration to be completed according to the information about the peer device and the information about the port conflicts with existing configuration specifically includes:

determining that a conflict exists if an MA ID in the CCM message is the same as corresponding configuration information of a configured MEP; or determining that a conflict exists if an MD level in the CCM message exists in an MD level of a configured MEP and an MD name or type is different; or determining that a conflict exists if the number of configured MAs exceeds an upper limit; or determining that a conflict exists if an MD name in an MA ID of a configured MEP is the same as an MD name in an MA ID in the CCM message, but an MD level of the configured MEP is different from an MD level in the CCM message; if the MD level of the configured MEP is the same as the MD level in the CCM message, directly using an existing MA ID.

Embodiment 2

Figure 3:
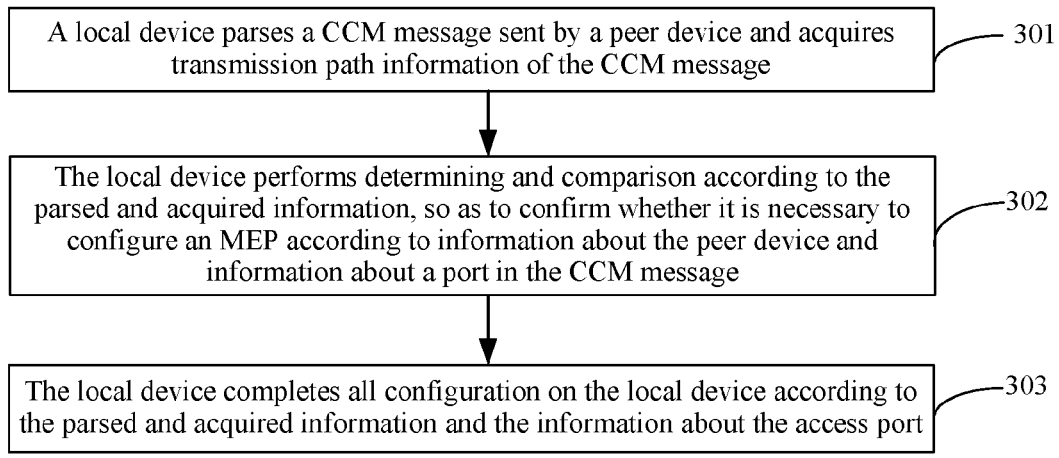
FIG. 3 is a flowchart of a MEP configuration method according to Embodiment 1 of the present invention.
Figure 4:
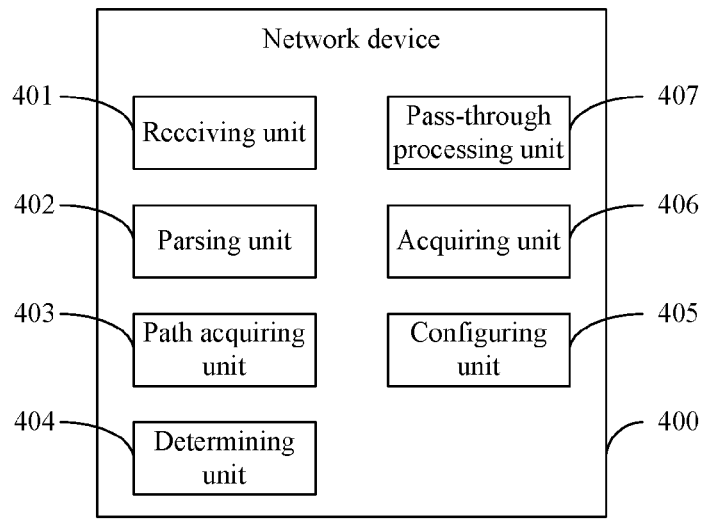
FIG. 4 is a schematic structural diagram of a network device according to a specific implementation manner of the present invention.

Embodiment 2 of the present invention provides a maintenance end point MEP configuration method. A technical scenario implemented in this embodiment is as follows: This embodiment is completed between a local device and a peer device, where MEP configuration has been completed on the peer device. User pre-configuration of the local device includes a designated port (certainly, in an actual situation, a user may also have other pre-configurations, such as pre-configuring an MD level). A method for completing the MEP configuration on the peer device may specifically be: enabling a CFM function; creating a maintenance domain MD, where an MD type, an MD name, and a level need to be designated; creating a maintenance association MA, where an MA type and an MA name need to be designated; associating the MA with a VLAN tag; configuring a CCM message transmission interval in the MA; and configuring an MEP List in the MA, where the user is required to designate an MEP ID of the peer device, add the MEP ID of the peer device to the MEP List, calculate an MEP ID of the local device according to the MEP ID of the peer device by using a preset algorithm, and add the MEP ID of the local device to the MEP List. As shown in FIG. 3, the method includes:

301: The local device parses a CCM message sent by the peer device and acquires transmission path information of the CCM message.

The parsing content includes but is not limited to:

parsing the received CCM message to acquire information about the peer device, where the information about the peer device includes but is not limited to: the MD type, name, and level, the MA type and name, the CCM message transmission interval, and the MEP ID of the peer device; and acquiring information about a port according to a transmission path of the CCM message, where the information includes but is not limited to: an identifier of an access port of the CCM message (for example, an access port number, and certainly it may be another type of identifier), and a VLAN tag of the CCM message, where a service detected by the CCM message can be specified according to the VLAN tag of the CCM message. Optionally, when completing MEP configuration, different manufacturers may further need to parse more additional information, and the information about the peer device is information that must be parsed and acquired.

Step 302: The local device performs determining and comparison according to the parsed and acquired information, so as to confirm whether it is necessary to configure an MEP according to the information about the peer device and the information about the port in the CCM message.

Determining content includes but is not limited to:
performing comparison with an existing MEP on the local device to determine whether the CCM message is a CCM message, of a configured MEP, that is sent by the peer device to the local device.

Comparison content includes but is not limited to: the MD level, type, and name, and the MA type and name. If information about the message is inconsistent with configuration of the existing MEP on the local device, it indicates that the message is not a message, of a configured MEP, that is sent by the local device to the peer device.

Comparison is performed with user pre-configuration to determine whether the acquired information about the peer device accords with other configurations (for example, an MD level) except an identifier of a port in the user pre-configuration.

A conflict check is performed to prevent a conflict with existing configuration.

A check range includes but is not limited to: the MD level, type, and name, and the MA type and name. Whether the content is duplicate with the existing configuration is checked. If duplicate, a conflict is determined.

303. The local device completes all configuration on the local device according to the parsed and acquired information and the information about the port.

For an implementation manner of the step 303, refer to the description in Embodiment 1, and details are not described here again.

Embodiment 3

Embodiment 3 of the present invention provides a maintenance end point MEP configuration method. A technical scenario implemented in this embodiment is the same as that in Embodiment 2. A difference from Embodiment 1 is that a pass-through CCM information list is configured on a local device in this embodiment, where the list is used to store a pass-through CCM message. The pass-through CCM message specifically is a message that passes the local device but the local device does not need to perform MEP configuration according to the CCM message. After a conflict is determined, this embodiment further includes the following step:
after it is confirmed that the CCM message does not match an existing MEP, it is confirmed that the CCM message also does not match pre-configuration preset by a user, or it is confirmed that the CCM message is not stored in a preset pass-through CCM information list, storing information about a peer device in the CCM message in the pass-through CCM information list.

A specific implementation manner after the conflict may specifically be:

A device that runs the mechanism parses a received CCM message in real time, where parsed content includes but is not limited to: an MD type, name, and level, an MA type and name, a CCM message transmission interval, an MEP ID, and the like.

After the parsing is complete, information about the message is compared with existing MEP configuration on the local device. Comparing content includes but is not limited to: the MD type, name, and level, the MA type and name, the CCM message transmission interval, and the like.

If a comparison result is the same, it indicates that the message is a message, of a configured MEP on the local device, that is sent by the peer device and does not need to be added to the pass-through CCM information list. If it is determined that content included in the CCM message is stored in the pass-through CCM information list, it is determined that the CCM message is a pass-through message; and the CCM is transparently transmitted, and the MEP configuration is not required. That a comparison result is the same may specifically be that: all content included in the compared content is the same. That a difference exists in the comparison result described below may specifically be that: any difference in the compared content means a difference in the comparison result.

If a difference exists in the comparison result, then it is determined whether the user has pre-configuration:

a. If the pre-configuration exists, a port at which an MEP designated in the pre-configuration is located receives the CCM message, and the CCM message successfully matches other information in the pre-configuration, it is considered that the message is a message that the local device expects to use to complete local MEP configuration; and the device completes the local MEP configuration according to content of the message, and the message does not need to be added to the pass-through CCM information list.

b. If the pre-configuration exists, a port at which an MEP designated in the pre-configuration is located receives the CCM message, but the CCM message fails to match another pre-configuration, for example, the user further designates an MD name, it indicates that the message is not a message sent to the local device; and if there is no information about the message in the pass-through CCM information list, the message is added to the pass-through CCM information list; otherwise, the message does not need to be added to the pass-through CCM information list repeatedly.

c. If the pre-configuration exists, but a port at which an MEP designated in the pre-configuration is located does not receive the message, it indicates that the message is not a message sent to the local device; and if there is no information about the message in the pass-through CCM information list, the message is added to the pass-through CCM information list; otherwise, the message does not need to be added to the pass-through CCM information list repeatedly.

d. If the pre-configuration does not exist, it indicates that the message is not a message sent to the local device; and if there is no information about the message the pass-through CCM information list, the message is added to the pass-through CCM information list; otherwise, the message does not need to be added to the pass-through CCM information list repeatedly.

An entry in the pass-through CCM information list is not permanently stored, and ageing may exist. An ageing mechanism is not limited herein, for example, an ageing mechanism of a time threshold is directly set. Certainly, there may be other ageing mechanisms.

A specific implementation manner of the present invention further provides a network device 400, where the network device 400 includes:
a receiving unit 401, configured to receive a continuity check message CCM from a peer device;
a parsing unit 402, configured to parse the CCM message to acquire information about the peer device;

a path acquiring unit 403, configured to acquire information about a port of the CCM message according to a path of the CCM message, where the information about the port includes: an identifier of an access port of the CCM message and a VLAN tag of the CCM message;

a determining unit 404, configured to determine whether MEP configuration to be completed according to the information about the peer device and the information about the port conflicts with existing configuration; and a configuring unit 405, configured to complete MEP configuration according to the information about the peer device and the information about the port when the determining unit determines that the MEP configuration to be completed according to the information about the peer device and the information about the port does not conflict with the existing configuration.

Optionally, the configuring unit 405 is specifically configured to:

enable a CFM function;

automatically create an MD according to a maintenance domain MD type, an MD name, and an MD level in the information about the peer device;

automatically create an MA according to a maintenance association MA type and an MA name in the information about the peer device;

automatically associate the created MA with the VLAN tag;

automatically configure a CCM message transmission interval in the created MA according to a CCM message transmission interval in the information about the peer device;

add an MEP ID of the peer device and an MEP ID of the network device 400 to an MEP List; and perform MEP configuration for a preset port and compare whether the identifier of the access port is the same as an identifier of the preset port; if the identifier of the access port is the same as the identifier of the preset port, configure an MEP direction to down down; and if the identifier of the access port is different from the identifier of the preset port, configure the MEP direction to up up.

Optionally, the network device 400 further includes:

an acquiring unit 406, configured to directly acquire a pre-configured MEP ID of the network device 400 or calculate the MEP ID of the network device 400 according to the MEP ID of the peer device by using a preset algorithm.

Optionally, the network device 400 further includes:

a pass-through processing unit 407, configured not to perform the MEP configuration when the determining unit determines that the MEP configuration to be completed according to the information about the peer device and the information about the port conflicts with the existing configuration; and then after it is confirmed that the CCM message does not match an existing MEP, it is confirmed that the CCM message also does not match pre-configuration preset by a user, or it is confirmed that the CCM message is not stored in a preset pass-through CCM information list, store the information about the peer device in the CCM message in the pass-through CCM information list.

Optionally, the determining unit 404 is specifically configured to:

determine that a conflict exists if an MA ID in the CCM message is the same as configuration information of a configured MEP; or determine that a conflict exists if the MD level in the CCM message exists in an MD level of a configured MEP and an MD name or type is different; or determine that a conflict exists if the number of configured MAs exceeds an upper limit; or determine that a conflict exists if an MD name in an MA ID of a configured MEP is the same as an MD name in an MA ID in the CCM message, but an MD level of the configured MEP is different from an MD level in the CCM message.

Figure 5:
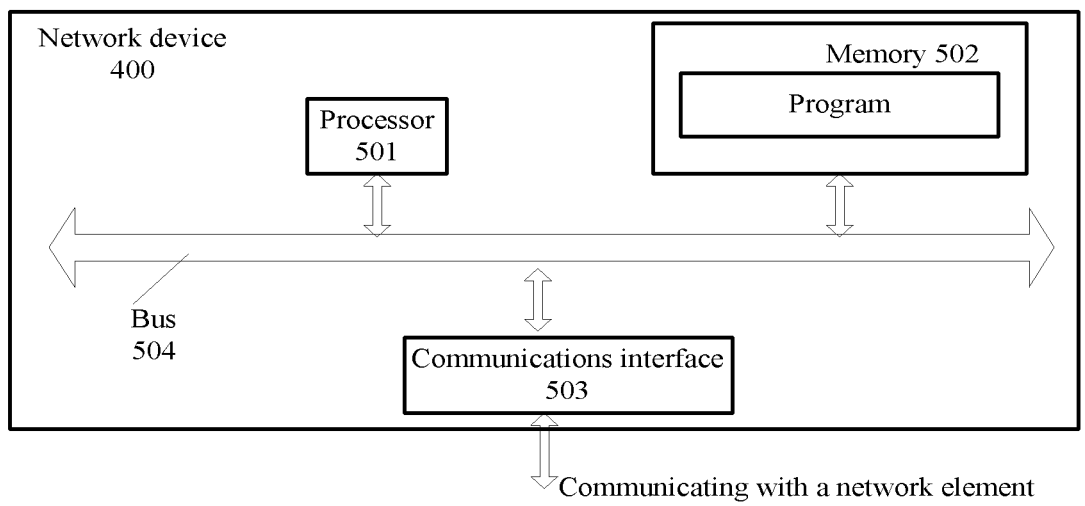
FIG. 5 is a schematic structural diagram of hardware of a network device according to a specific implementation manner of the present invention.

A specific implementation manner of the present invention further provides a network device 400. A hardware structure of the network device 400 is shown in FIG. 5. The network device includes: a processor 501, a memory 502, a communications interface 503, and a bus 504.

The processor 501, the memory 502, and the communications interface 503 are connected to each other by using the bus 504. The bus 504 may be an Industry Standard Architecture (ISA) bus, a Peripheral Component Interconnect (PCI for short) bus, or the like.

The processor 501 may be a general processor, including a central processing unit (CPU for short), a network processor (NP for short), and the like.

The memory 502 is configured to store a program 5. Specifically, the program may include program code. The program code includes a computer operation instruction. The program is configured to instruct the processor 401 to send the computer operation instruction. The memory 502 may include a high-speed random-access memory (RAM for short) and may further include a non-volatile memory, for example, at least one disk storage.

The communications interface 503 is configured to receive or send a message. Specifically, the message may be a CCM message and certainly may be another message. Specifically, the communications interface 503 may be a communications port.

The communications interface 503 receives a continuity check message CCM from a peer device.

The processor 501 parses the CCM message to acquire information about the peer device and acquire information about a port of the CCM message according to a path of the CCM message, where the information about the port includes: an identifier of an access port of the CCM packet and a VLAN tag of the CCM message; determines whether MEP configuration to be completed according to the information about the peer device and the information about the port conflicts with existing configuration; and when it is determined that the MEP configuration to be completed according to the information about the peer device and the information about the port does not conflict with the existing configuration, completes MEP configuration according to the information about the peer device and the information about the port.

The processor 501 is specifically configured to: enable a CFM function; automatically create an MD according to a maintenance domain MD type, an MD name, and an MD level in the information about the peer device; automatically create an MA according to a maintenance association MA type and an MA name in the information about the peer device; automatically associate the created MA with the VLAN tag; automatically configure a CCM message transmission interval in the created MA according to a CCM message transmission interval in the information about the peer device; add an MEP ID of the peer device and an MEP ID of the network device 400 to an MEP List; and perform MEP configuration for a preset port and compare whether the identifier of the access port is the same as an identifier of the preset port; if the identifier of the access port is the same as the identifier of the preset port, configure an MEP direction to down down; and if the identifier of the access port is different from the identifier of the preset port, configure the MEP direction to up up.

Optionally, the processor 501 further directly acquires a pre-configured MEP ID of the network device 400 or calculates the MEP ID of the network device 400 according to the MEP ID of the peer device by using a preset algorithm.

Optionally, the processor 501 is further configured not to perform the MEP configuration when it is determined that the MEP configuration to be completed according to the information about the peer device and the information about the port conflicts with the existing configuration; and then after it is confirmed that the CCM message does not match an existing MEP, it is confirmed that the CCM message also does not match pre-configuration preset by a user, and it is confirmed that the CCM message is not stored in a preset pass-through CCM information list, store the information about the peer device in the CCM message in the pass-through CCM information list.

Optionally, the processor 501 is further configured to: determine that a conflict exists if an MA ID in the CCM message is the same as configuration information of a configured MEP; or
  determine that a conflict exists if an MD level in the CCM message exists in an MD level of a configured MEP and an MD name or type is different; or
  determine that a conflict exists if the number of configured MAs exceeds an upper limit; or
  determine that a conflict exists if an MD name in an MA ID of a configured MEP is the same as an MD name in an MA ID in the CCM message, but an MD level of the configured MEP is different from an MD level in the CCM message.

A specific implementation manner of the present invention provides a network system, where the system includes a first network device and a second network device.

The first network device is configured to send a continuity check message CCM to the second network device; and
  the second network device is configured to receive a CCM message from a peer device; parse the CCM message to acquire information about the peer device and acquire information about a port receiving the CCM message, where the information about the port includes: identifier information of the port receiving the CCM message and a virtual local area network tag VLAN tag of the CCM message; and complete MEP configuration according to the information about the peer device and the information about the port.

The modules or units involved in the foregoing unit and system embodiments are divided merely based on function logic; however, the division is not limited to the division manner described above, as long as corresponding functions can be implemented; in addition, specific names of the functional modules are only used for distinguishing the modules from each other, and are not intended to limit protection scope of the present invention.

Persons skilled in the art may understand that, all or some steps in the technical solution provided by the embodiments of the present invention may be completed through a program instructing relevant hardware, for example, implementation may be performed by using a computer to run the program. The program may be stored in a readable storage medium, such as a random access memory, a magnetic disk, and an optical disc.

The foregoing descriptions are merely exemplary embodiments of the present invention, but are not intended to limit the present invention. Any equivalent replacement or improvement made without departing from the specific implementation manner of the present invention should fall within the protection scope of the present invention.

What is claimed is:

1. A maintenance end point (MEP) configuration method, comprising:
  receiving a continuity check message (CCM) from a peer device;
  parsing the CCM message to acquire information about the peer device, wherein the information about the peer device comprises: a maintenance domain (MD) level, a maintenance association identifier (MA ID), and a CCM transmission interval of a peer MEP;
  acquiring information about a port receiving the CCM message, wherein the information about the port comprises: identifier information of the port receiving the CCM message and a virtual local area network tag (VLAN tag) of the CCM message;
  completing MEP configuration according to the information about the peer device and the information about the port; and
  configuring the MEP using the MEP configuration,
  wherein the completing MEP configuration according to the information about the peer device and the information about the port comprises:
  creating an MD according to a maintenance domain (MD) type, an MD name, and the MD level in the information about the peer device;
  creating an MA according to a maintenance association (MA) type and an MA name in the information about the peer device;
  associating the created MA with the VLAN tag;
  configuring a CCM message transmission interval in the created MA according to the CCM message transmission interval in the information about the peer device;
  adding an MEP ID of the peer device and an MEP ID of a local device to an MEP List; and
  performing MEP configuration for a preset port and comparing whether the identifier information of the port is the same as an identifier of the preset port; if an identifier of the access port is the same as the identifier of the preset port, configuring an MEP direction to down; and if the identifier of the access port is different from the identifier of the preset port, configuring the MEP direction to up.

2. The method according to claim 1, wherein before the completing MEP configuration according to the information about the peer device and the information about the port, the method further comprises:
  determining whether MEP configuration to be completed according to the information about the peer device and the information about the port conflicts with existing configuration; and if the MEP configuration to be completed according to the information about the peer device and the information about the port does not conflict with the existing configuration, completing the MEP configuration according to the information about the peer device and the information about the port.

3. The method according to claim 1, wherein a manner of acquiring the MEP ID of the local device is:
  directly acquiring a pre-configured MEP ID of the local device or calculating the MEP ID of the local device according to the MEP ID of the peer device by using a preset algorithm.

4. The method according to claim 2, wherein the method further comprises:
skipping performing the MEP configuration if the MEP configuration to be completed according to the information about the peer device and the information about the port conflicts with the existing configuration; and after it is confirmed that the CCM message does not match an existing MEP, it is confirmed that the CCM message also does not match pre-configuration preset by a user, or it is confirmed that the CCM message is not stored in a preset pass-through CCM information list, storing the information about the peer device in the CCM message in the pass-through CCM information list.

5. The method according to claim 2, wherein the determining whether MEP configuration to be completed according to the information about the peer device and the information about the port conflicts with existing configuration comprises:
determining that a conflict exists if the MA ID in the CCM message is the same as configuration information of a configured MEP; or
determining that a conflict exists if the MD level in the CCM message exists in an MD level of a configured MEP and an MD name or type is different; or
determining that a conflict exists if a number of configured MAs exceeds an upper limit; or
determining that a conflict exists if an MD name in an MA ID of a configured MEP is the same as an MD name in the MA ID in the CCM message, but an MD level of the configured MEP is different from the MD level in the CCM message.

6. A network device, wherein the network device comprises: a processor, a memory, a communications interface, and a bus, wherein:
the communications interface is configured to receive a continuity check message(CCM) from a peer device; and
the processor is configured to:
parse the CCM message to acquire information about the peer device, wherein the information about the peer device comprises: a maintenance domain (MD) level, a maintenance association identifier (MA ID), and a CCM transmission interval;
acquire information about a port receiving the CCM message, wherein the information about the port comprises: identifier information of the port receiving the CCM message and a virtual local area network tag (VLAN tag) of the CCM message;
complete maintenance end point (MEP) configuration according to the information about the peer device and the information about the port; and
configure the MEP using the MEP configuration,
wherein the processor is configured to:
automatically create a maintenance domain (MD) according to an MD type, an MD name, and the MD level in the information about the peer device;
automatically create a maintenance association (MA) according to a maintenance association MA type and an MA name in the information about the peer device;
automatically associate the created MA and the VLAN tag;
automatically configure a CCM message transmission interval in the created MA according to a CCM message transmission interval in the information about the peer device;
add an MEP ID of the peer device and an MEP ID of the network device to an MEP List;
perform MEP configuration for a preset port and compare whether an identifier of the access port is the same as an identifier of the preset port; if the identifier of the access port is the same as the identifier of the preset port, configure an MEP direction to down; and if the identifier of the access port is different from the identifier of the preset port, configure the MEP direction to up.

7. The device according to claim 6, wherein the processor is further configured to:
determine whether MEP configuration to be completed according to the information about the peer device and the information about the access port conflicts with existing configuration; and when it is determined that the MEP configuration to be completed according to the information about the peer device and the information about the access port does not conflict with the existing configuration, complete the MEP configuration according to the information about the peer device and the information about the port.

8. The network device according to claim 6, wherein a manner of acquiring the MEP ID of the local device is:
directly acquiring a pre-configured MEP ID of the local device or calculating the MEP ID of the local device according to the MEP ID of the peer device by using a preset algorithm.

9. The network device according to claim 7, the processor is further configured to:
skip performing the MEP configuration if the MEP configuration to be completed according to the information about the peer device and the information about the port conflicts with the existing configuration; and after it is confirmed that the CCM message does not match an existing MEP, it is confirmed that the CCM message also does not match pre-configuration preset by a user, or it is confirmed that the CCM message is not stored in a preset pass-through CCM information list, storing the information about the peer device in the CCM message in the pass-through CCM information list.

10. The network device according to claim 7, the processor is configured to:
determine that a conflict exists if the MA ID in the CCM message is the same as configuration information of a configured MEP; or
determine that a conflict exists if the MD level in the CCM message exists in an MD level of a configured MEP and an MD name or type is different; or
determine that a conflict exists if a number of configured MAs exceeds an upper limit; or
determine that a conflict exists if an MD name in an MA ID of a configured MEP is the same as an MD name in the MA ID in the CCM message, but an MD level of the configured MEP is different from the MD level in the CCM message.

11. A network system, wherein the system comprises: a first network device and a second network device, wherein:
the first network device is configured to send a continuity check message (CCM) to the second network device; and
the second network device is configured to:
receive a CCM message from the first network device;
parse the CCM message to acquire information about the first network device, wherein the information about the first network device comprises: a maintenance domain (MD) level, a maintenance association identifier (MA ID), and a CCM transmission interval;

acquire information about a port receiving the CCM message, wherein the information about the port comprises: identifier information of the port receiving the CCM message and a virtual local area network tag (VLAN tag) of the CCM message;

complete maintenance end point (MEP) configuration according to the information about the first network device and the information about the port; and configure the MEP using the MEP configuration, wherein the second network device is configured to:

create an MD according to a MD type, an MD name, and the MD level in the information about the first network device;

create an MA according to a MA type, and an MA name in the information about the first network device;

associate the created MA with the VLAN tag;

configure a CCM message transmission interval in the created MA according to the CCM message transmission interval in the information about the first network device;

add an MEP ID of the first network device and an MEP ID of the second network device to an MEP list; and perform MEP configuration for a preset port and compare whether the identifier information of the port is the same as an identifier of the preset port;

if an identifier of the access port is the same as the identifier of the preset port, configure an MEP direction to down; and if the identifier of the access port is different from the identifier of the preset port, configuring the MEP direction to up.

12. The network system according to claim 11, the second network device is further configured to:

determine whether MEP configuration to be completed according to the information about the first network device and the information about the port conflicts with existing configuration; and if the MEP configuration to be completed according to the information about the first network device and the information about the port does not conflict with the existing configuration, complete the MEP configuration according to the information about the first network device and the information about the port.

13. The network system according to claim 12, the second network device is further configured to:

skip perform the MEP configuration if the MEP configuration to be completed according to the information about the first network device and the information about the port conflicts with the existing configuration; and after it is confirmed that the CCM message does not match an existing MEP, it is confirmed that the CCM message also does not match an existing MEP, it is confirmed that the CCM message also does not match pre-configuration preset by a user, or it is confirmed that the CCM message is not stored in a preset pass-through CCM information list, storing the information about the peer device in the CCM message in the pass-through CCM information list.

14. The network system according to claim 12, the second network device is further configured to:

determine that a conflict exists if the MA ID in the CCM message is the same as configuration information of a configured MEP; or determine that a conflict exists if the MD level in the CCM message exists in an MD level of a configured MEP and an MD name or type is different; or determine that a conflict exists if a number of configured MAs exceeds an upper limit; or determine that a conflict exists if an MD name in an MA ID of a configured MEP is the same as an MD name in the MA ID in the CCM message, but an MD level of the configured MEP is different from the MD level in the CCM message.

* * * * *